March 18, 1958 K. J. TOBIN 2,827,000
CARGO LOADING APPARATUS
Filed Dec. 7, 1953 5 Sheets-Sheet 3
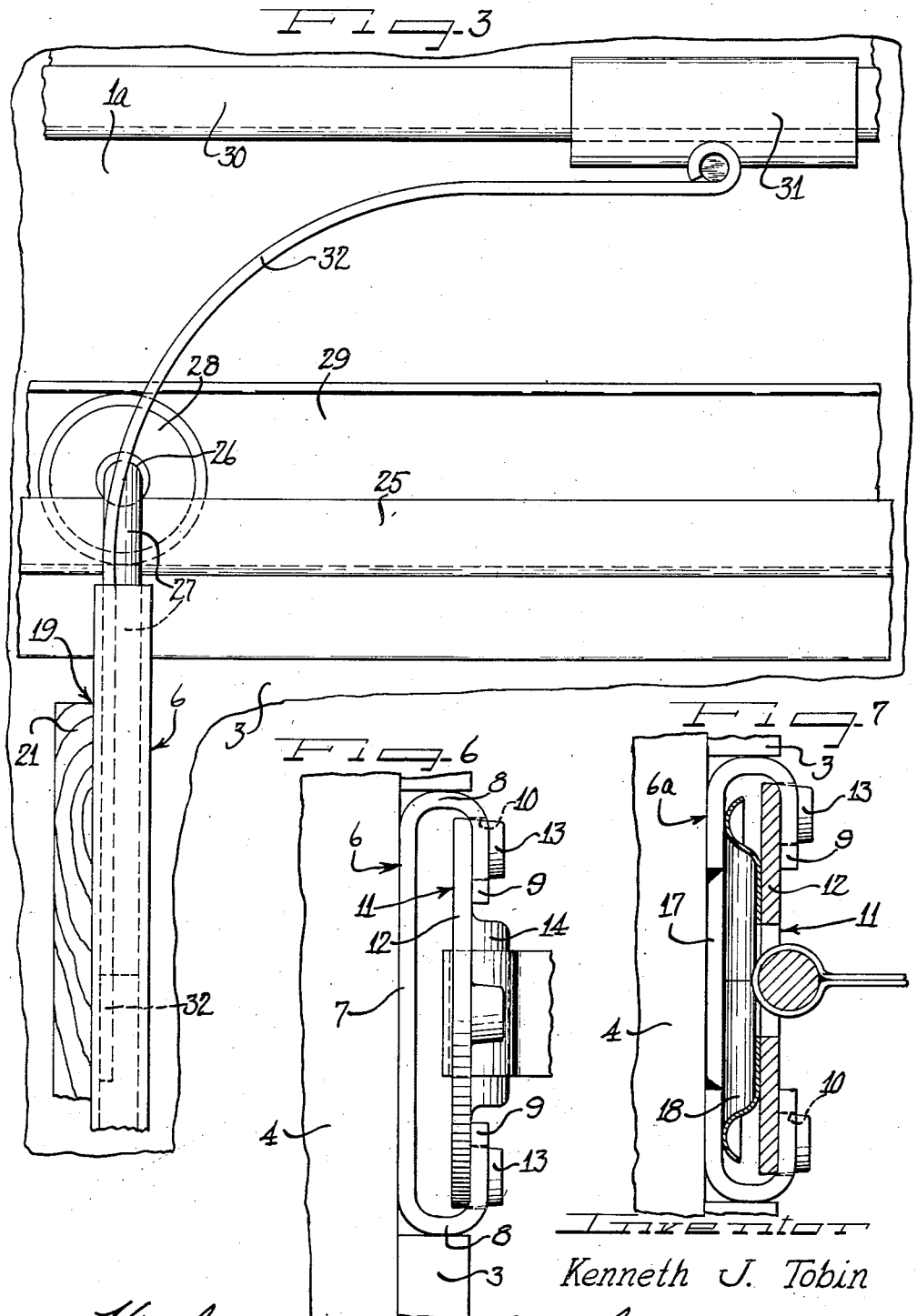
Inventor
Kenneth J. Tobin March 18, 1958 K. J. TOBIN 2,827,000
CARGO LOADING APPARATUS
Filed Dec. 7, 1953 5 Sheets-Sheet 5
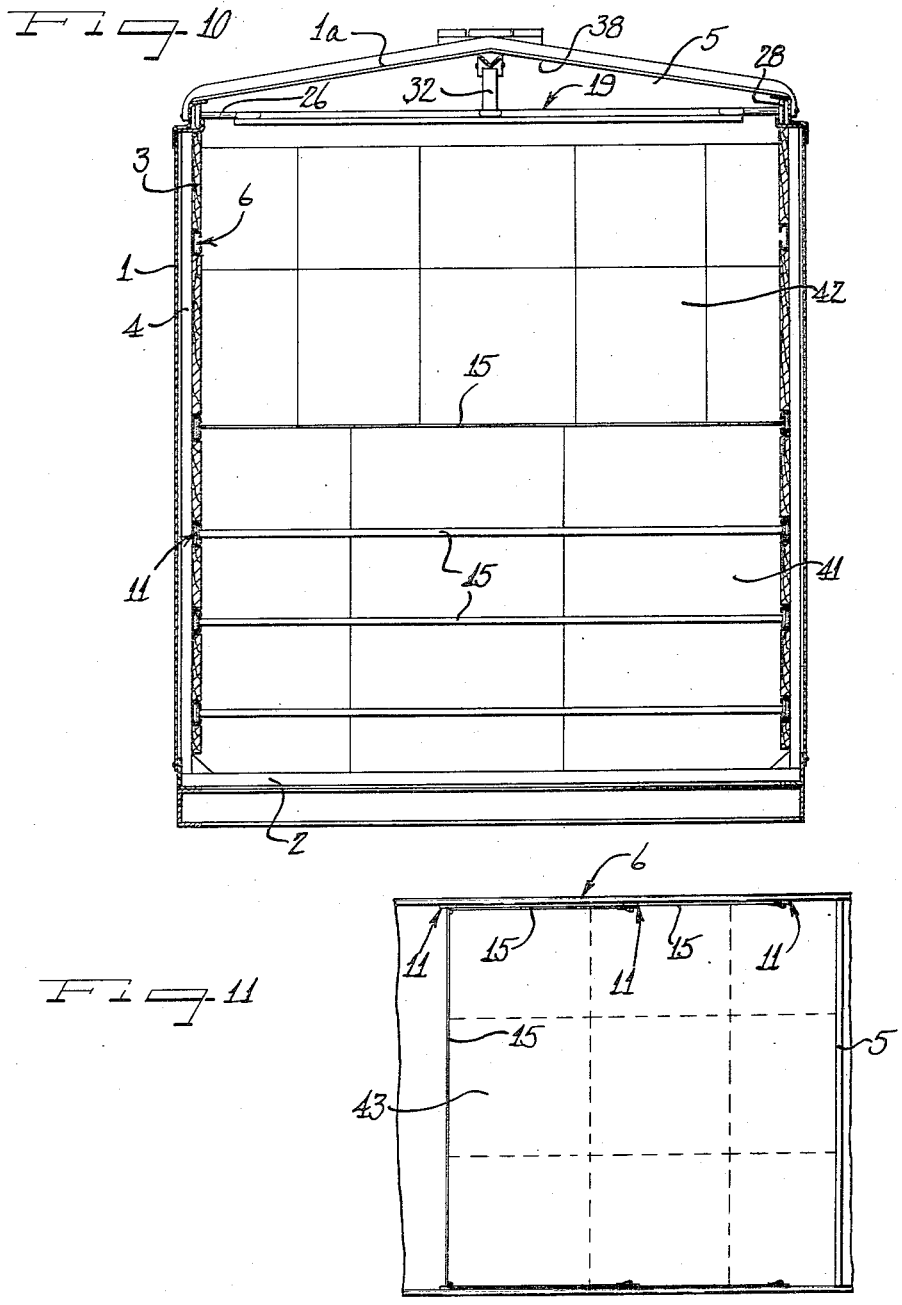
Inventor
Kenneth J. Tobin March 18, 1958     K. J. TOBIN     2,827,000
CARGO LOADING APPARATUS
Filed Dec. 7, 1953     5 Sheets-Sheet 4
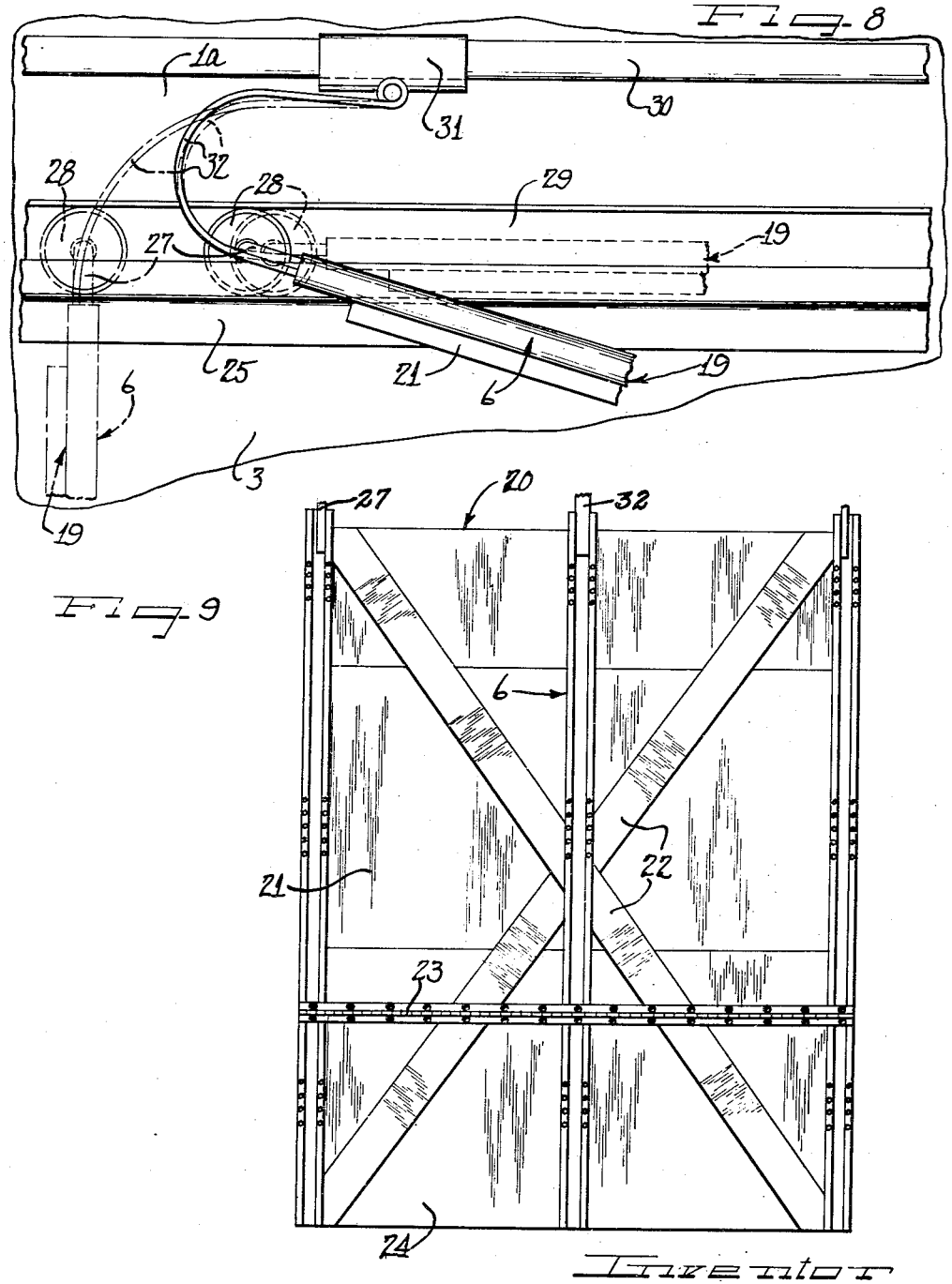
Inventor
Kenneth J. Tobin

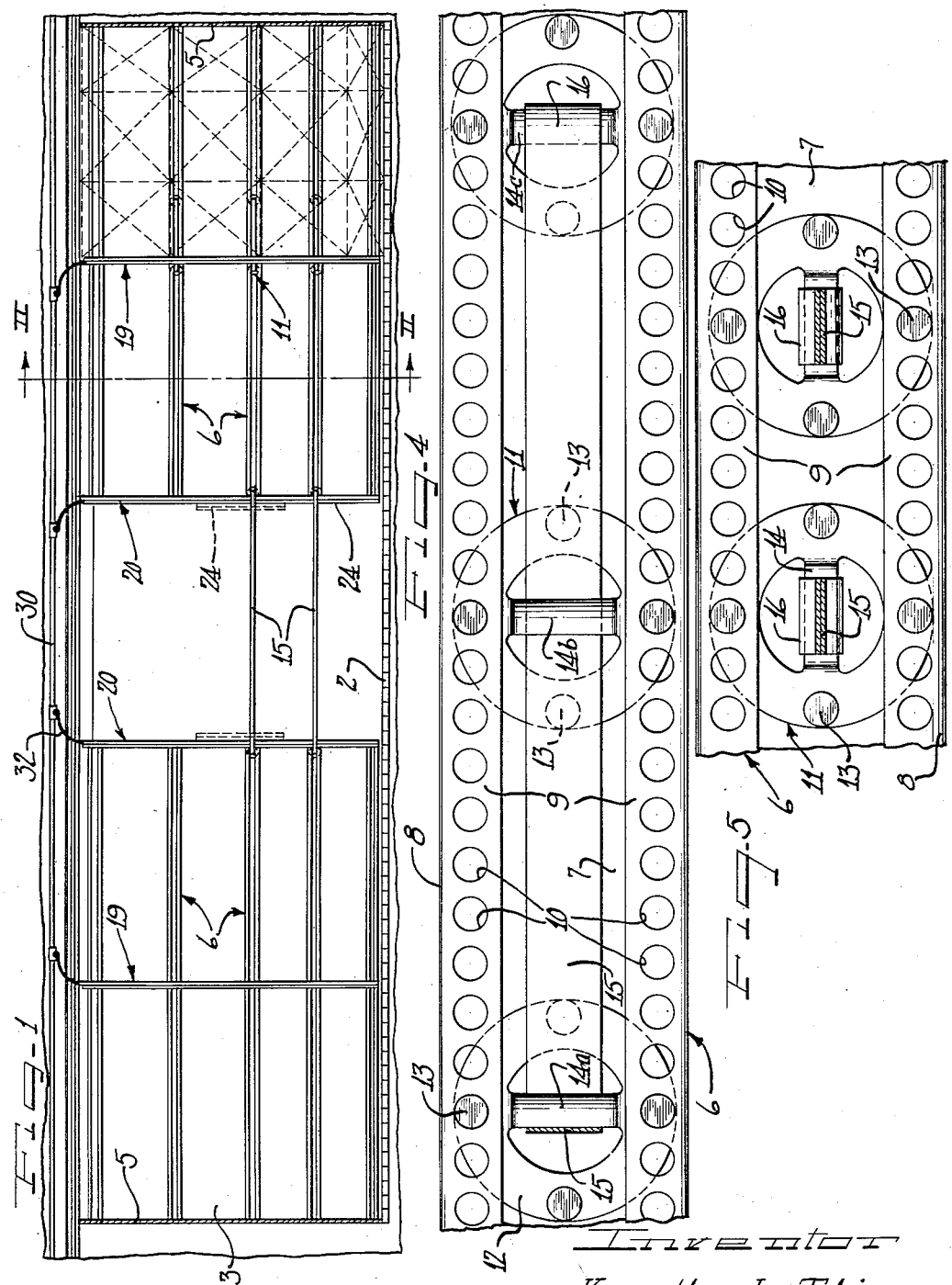
March 18, 1958     K. J. TOBIN     2,827,000
CARGO LOADING APPARATUS
Filed Dec. 7, 1953     5 Sheets-Sheet 1
Inventor
Kenneth J. Tobin

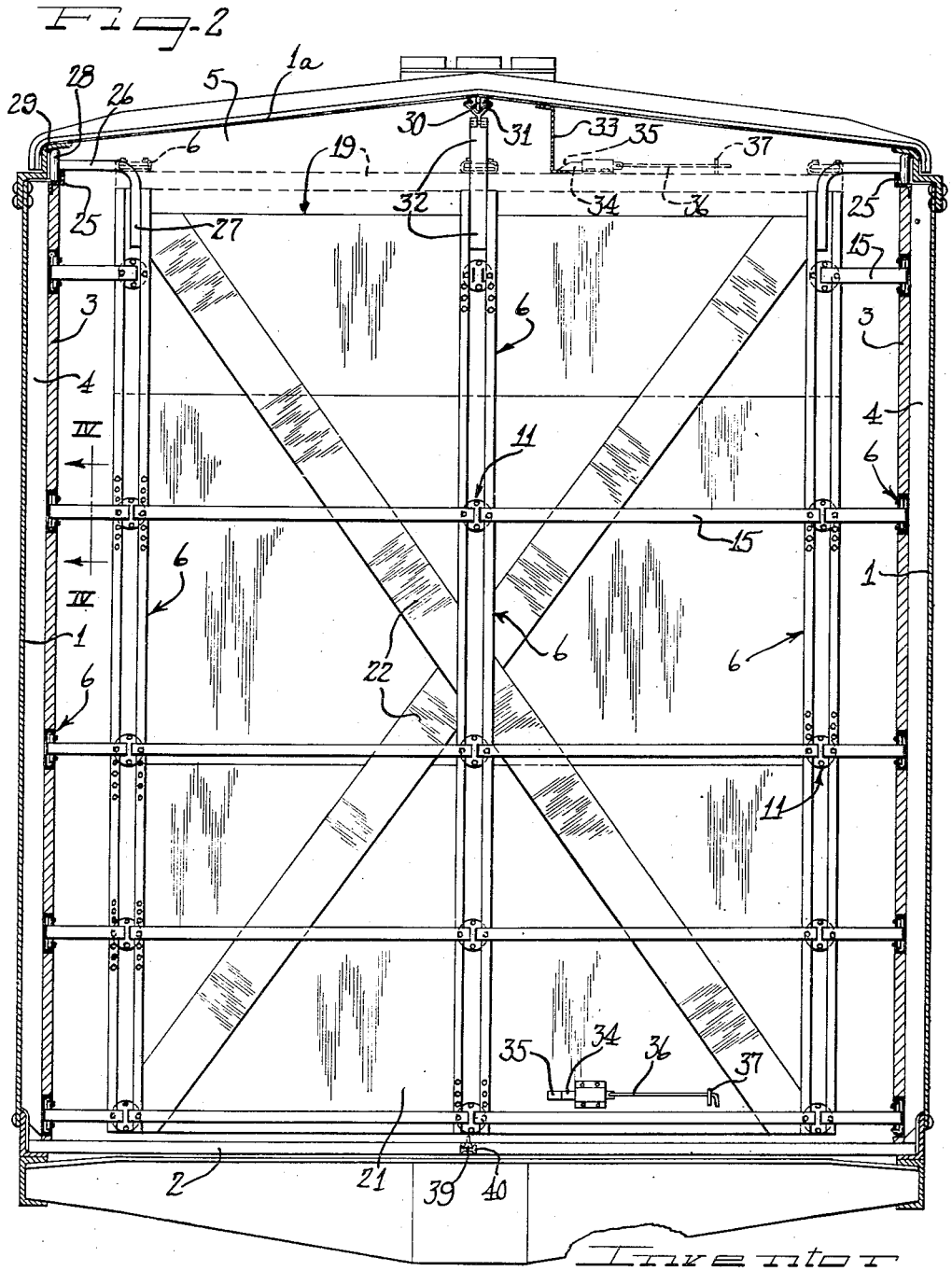

United States Patent Office 2,827,000
Patented Mar. 18, 1958

2,827,000

CARGO LOADING APPARATUS

Kenneth J. Tobin, Sarasota, Fla., assignor to Evans Products Company, Plymouth, Mich., a corporation of Delaware Application December 7, 1953, Serial No. 396,422

11 Claims. (Cl. 105—369)

This invention relates to cargo loading apparatus, and more particularly to simplified means for securing loads, lading, or storage goods in place, and the apparatus may be partially or wholly installed in substantially any type of vehicle, including boxcars, gondola cars, flat cars, automotive trucks, trailers, airplanes, ships, or it may be utilized in warehouse practice, it only being necessary to modify the apparatus to fit the particular space in which it is to be located, the apparatus having many and various uses and purposes as will be apparent to one skilled in the art.

In the past, many and various types and varieties of cargo loading apparatus have been provided, but have not proven as efficient as desired for many installations. An important object of cargo loading apparatus, other than to protect cargo from damage while in transit, is, of course, to eliminate the expense of dunnage on the part of the shipper, as much as possible. At the same time, the provision of cargo loading apparatus of a highly efficient character eliminates considerable expenses heretofore necessary on the part of the transporter in repairing the carrier vehicle by virtue of damage done in the affixing and removing of dunnage by the shipper and receivers of the cargo.

Loading apparatus heretofore developed most frequently embodied a number of removable parts, and obviously it was difficult to have the required number of parts to meet the requirements of all different kinds of loads, and these removable parts become lost, strayed, or stolen, so that the expense of replacement was considerable, and frequently there would be a carrier vehicle without sufficient parts to properly hold the cargo and resort would have to be made to the old fashioned dunnage. In other cases, the loading apparatus was such that if not used, owing to a uniformly filled carrier vehicle, the loading apparatus could not be stowed and the registered volumetric content of the vehicle maintained. Further, with loading apparatus of the character heretofore known, it was almost essential that a receiver removing a portion of a stop-over shipment, was required to level off the remainder of the load to prevent injury to it.

An easy way of supporting a load in a vehicle is by the use of expendible metal strapping, and that was not possible to the desired extent with loading apparatus heretofore known. Also, that strapping could not heretofore be utilized in vertical position for supporting the ends of loads and in horizontal position for providing a transverse platform for lighter loads disposed thereabove.

With the foregoing in mind, it is an important object of the instant invention to provide means for securing lading in place, with the exception of the expendible metal stripping, which means are fully self-contained in the carrier vehicle.

Another object of the invention is the provision of cargo loading apparatus so constructed as to eliminate all dunnage cost to the shipper, with the single exception of expendible strapping.

Another object of the invention resides in the provision of cargo loading apparatus to which metal strapping may readily be connected, and no part of the apparatus is removable from the carrier vehicle.

It is also a highly important object of this invention to provide cargo loading apparatus which may be installed in substantially any character of carrier vehicle, and which apparatus may be so mounted and stowed, when not in use, that the vehicle has the full registered cubic foot capacity, and inside length, width and height.

Another feature of the invention is the provision of cargo loading apparatus embodying better securing means to hold the load against shifting and damage during transit, and which will firmly and safely carry substantially any type of bulk or package load including frangibles and explosives.

Still another feature of the invention resides in the provision of means for securing lading in place, which means are of such construction as to permit an easy division of the load or lading into a plurality of units for stop over freight movement.

Also an object of the invention resides in the provision of means for securing lading in place so constructed as to eliminate the need of levelling off the remainder of the load when the doorway lading has been removed.

The invention also seeks the provision of means for securing lading in place so arranged as to permit substantially universal adjustment of the means, and the expendible strapping used therewith, to adequately fit any character of load or mixed loads, and the strapping may be used anywhere desired in spacing increments as fine as one inch.

Still another object of the invention resides in the provision of cargo loading apparatus which includes movable gates, some of which are foldable to facilitate their use and movement, and which gates all may be stowed overhead under the roof of the car or vehicle when not in use. Such gates have an added advantage in providing a dead air space at the top of the vehicle, when not in use, thus keeping out moisture, which is highly advantageous for certain loads such as flour, etc., which absorb moisture to the detriment of the load itself.

Still another and highly important object of the instant invention is the provision of cargo loading apparatus highly adaptable for use with expendible metallic strapping, and so constructed that the strapping may be used with the width thereof in vertical position against the lading, or with the width thereof in horizontal position to build a deck for light weight freight, as well as holding down the lading therebeneath against upward movement during travel of the carrier vehicle. The arrangement is such, also, that the strapping may be used double where desired, or the same strap or band may be anchored to more than one holding element at each end portion.

It is a still further object of the invention to provide a cargo loading apparatus so constructed as to permit the selective installation of different types of side rails, one type preventing leakage of grain outside the car lining, and the other type permitting the installation to be made for any size anchor member.

While some of the more salient features, characteristics and advantages of the instant invention have been above pointed out, others will become apparent from the following disclosures, taken in conjunction with the accompanying drawings, in which—

Figure 1 is a fragmentary vertical sectional view of a freight car equipped with cargo loading apparatus, shown in elevation, embodying principles of the instant invention, the section being taken immediately inside the lining of one side of the freight or boxcar;

Figure 2 is an enlarged transverse vertical sectional view through the car and taken substantially as indicated by the line II—II of Figure 1, looking in the direction of the arrows;

Figure 3 is an enlarged fragmentary side elevational view, illustrating the mounting of one of the separating gates embodied in the apparatus of this invention;

Figure 4 is a fragmentary elevational view of a side rail, illustrating the use of the anchor members with expendible metal strappings;

Figure 5 is a view similar in character to Fig. 4, but illustrating a different disposition of the anchor members and strapping;

Figure 6 is a fragmentary enlarged end elevational view, illustrating a side rail equipped with one form of anchor member;

Figure 7 is a view similar in character to Fig. 6, but illustrating a slightly different form of side rail and anchor member;

Figure 8 is a fragmentary side elevational view illustrating the operation of one of the separating gates;

Figure 9 is a fragmentary front elevational view of a folding separation gate;

Figure 10 is a transverse sectional view through the boxcar, illustrating the use of the instant invention for the loading of certain types of cargo; and Figure 11 is a fragmentary plan view illustrating the use of double strapping in connection with a cargo.

As shown on the drawings:

For the purpose of convenience and clarity, the instant invention is shown and described in connection with a freight or boxcar of the type commonly used on all railroads, although, as stated above, the invention may be installed in whole or in part in many and various other locations, both vehicular and stationary, as will be evident from the following disclosures.

The illustrated boxcar includes an outer wall or shell 1 which may be made of steel or any suitable material, a floor 2, and a roof 1a. The outer wall, of course, encloses both sides and the ends of the car. Inside the outer wall are opposed side linings 3—3 separated from the outer wall by side posts 4 at spaced intervals. End linings 5—5 are also provided. The car construction is indicated in Figs. 1 and 2.

Each side lining 3 is provided with slots therein extending lengthwise thereof to accommodate channel shaped retaining rails generally indicated by numeral 6 and which are inset in the lining slots, so that the inner surface of each rail is preferably flush with the inner face of the lining. These rails may be secured to the side posts 4 of the car in any suitable manner such as by bolts if the posts are wood, or by welding if the posts are metal. In most cases, five of these retaining rails along each side of the car will be sufficient, and from the showing in Figs. 1 and 2, it will be noted that the rails are preferably closer together in the lower half of the car, three rails being disposed therein, and more widely spaced in the upper half of the car, wherein two rails are shown. The rails on one side of the car are directly opposite those on the other side of the car, and obviously the rails do not run across the door space as seen in Fig. 1. The rails are positioned substantially parallel to the floor 2 of the box car. It will be especially noted that with this arrangement, the retaining rails do not detract from the registered interior width of the car.

With reference now to Figs. 4, 5 and 6, it will be seen that each retaining rail is in the form of a channel comprising a base 7 secured to the side posts 4 of the car, rounded side margins 8—8, and forward flanges 9—9. These forward flanges are arranged with confronting spaced apart edges and as seen clearly in Fig. 6 are spaced away from the base 7. Each forward flange 9 is provided with spaced apertures 10 in a series extending the full length of the flange. Preferably these apertures are spaced apart a distance of one inch center to center, although a greater spacing may be utilized but will not give the fine increments of adjustment mostly desired.

With the structure shown in Figs. 4, 5 and 6, it will be noted that the base of each rail is solid and these rails are highly suitable for use in cars that may sometimes be intended to carry bulk commodities of the character of grain, and the solid base 7 of each rail prevents any of such a commodity passing through into the space between the lining 3 and the outer car wall or shell 1 where it would not be recoverable, and if wetted would swell and bulge the outer wall or lining.

Inside each retaining rail or channel 6 is a plurality of anchor members or elements generally indicated by numeral 11. Each element is disk-like in character, and embodies a flat ring portion 12 and from the front face of which four lugs or pins 13 extend. These pins are evenly spaced, or 90° apart, and are preferably tapered, and of a size to readily fit within one of the apertures 10 in the front flanges of the retaining channel. It will be noted from the showing in Fig. 6, that each anchor member may be moved rearwardly within the channel 7 sufficiently to disengage the lugs or pins from the front flanges so that the anchor member may be slid laterally along the channel to a desired location. Across the central portion of each anchor member is a diametrally disposed bar 14, and this bar is preferably of a thickness equalling both a pin 13 and the ring 12, as seen best in Fig. 6. That not only strengthens the bar, but also provides excellent frictional contact between the anchor member and a strap, when the strap is merely woven through the anchor member and not directly secured thereto.

The well known metal strapping heretofore utilized as a means for securing lading in position, and also as a means for binding heavy packages, may be secured to the cross bar 14 of an anchor element, after the anchor element has been placed in a desirable location. However in Fig. 4, I have shown a slightly different method for securing a strap 15 in place. In this instance, three spaced anchor members are utilized to secure one end portion of the strap. The anchor member to the right has the strap end secured around its cross bar 14c in the form of a loop 16. Then the strap is threaded through the intermediate anchor member, the strap passing over both the unused pins 13—13 on the horizontal diameter of the anchor member, and beneath the cross bear 14b of that anchor member, after which the strap is threaded over the first unused pin 13 of the left-hand anchor member, underneath and around the cross bar 14a so as to extend laterally across the car in engagement with the load. After passing across the car in contact with the load, the opposite end portion of the strap is similarly secured to anchor members on the other side of the car. This arrangement is particularly desirable for heavy loads because the reaction to the pulling force on the strap 15 is spread over a greater area of each side of the car than would be the case if the strap was secured directly to two opposed anchor members only.

Now in many cases it may be desirable to provide a temporary deck for a lightweight load to rest upon, or to hold down a load by strapping it laterally across the top. In Fig. 5 I have illustrated how this may be accomplished. It is a simple expedient to rotate an anchor member until the cross bar thereof is horizontal, and then the other two pins 13 that were not in use in the showing of Fig. 4 are inserted in opposed apertures in the front flanges 9 of the retaining rail 6. A strap 15 may be looped as at 16 around the horizontal cross bar, and in this instance the width of the strap will be disposed horizontally over the top of a load, or underneath a lightweight load which rests upon a series of such straps.

The straps may obviously be located any distance apart, even to a minimum of four inches with the illustrated embodiment of the invention.

In some installations, it may be desirable to use a slightly different form of retaining rail. To this end, I have illustrated in Fig. 7 a retaining rail of the same construction as that previously described with the exception that it is made in two pieces so that instead of having a solid base 7, there is a space 17 between the two elements. This retaining rail is generally indicated by numeral 6a, and of course both pieces of the rail must be secured to the side posts of the car. With this arrangement, however, the two portions of the retaining rail may be spaced apart at a predetermined distance to accommodate a smaller or a larger anchor member 11, depending upon intended uses for the particular car. In the instance of Fig. 7 I have also illustrated a resilient spider spring arrangement 18 secured to the back of the ring portion 12 of the anchor member, which spring normally maintains the anchor member thrust outwardly with two of the pins engaged in apertures of the front flanges 9 of the retaining rail. When it is desired to change the position of the anchor member, it is pushed inwardly against the action of the spring 18 until the desired shifting has been accomplished. Of course, such a spring may be used on the anchor member shown in Fig. 6 with the previously described retaining rail 6, if so desired. The use of the spring backing eliminates rattling or shifting of position of unused anchor members during transit, and also aids the operator in quickly fixing the anchor member to the retaining rail in the desired position, and keeping it there while attaching a strap.

While the structure so far described, including the retaining channels or rails and the anchor members, along with expendible strapping, is all that is required to properly secure many types of lading, in other cases it is not sufficient, and that is particularly true where it is desired to divide the load into sections. Division of a load is desirable where it is of mixed character, and also desirable for stop-over freight; i. e., where the car will stop at several different destinations and a portion of its contents is removed at each one.

To this end, I have provided separation or dividing gates, and in the illustrated instance, referring to Fig. 1, I have indicated two solid end gates generally indicated by numeral 19, and two center gates generally indicated by numeral 20 which are provided with hinged portions to facilitate their adjustment.

With reference now to Fig. 2, it will be seen that a gate 19 preferably includes plywood facing 21 reinforced on one side as indicated at 22. The gate is also preferably provided with a plurality of evenly spaced retaining channels extending vertically of the gate, these being the same as the previously described retaining channels or rails 6. In the illustrated instance there are three such rails on each gate, one at each side edge, and one in the center, and looking again at Fig. 2, it will be seen that the center retaining rail passes through and not over the reinforcing 22 so as not to unduly increase the thickness of the gate. The gate need not be the full width of the car, it being quite satisfactory to have the gate sixteen inches less in width than the inside of the car.

When the gate is placed in vertical position against a load, the strapping may go around the gate and be interwoven through anchor members 11 in the retaining channels or rails 6 on the gate as clearly shown in Fig. 2. Each strap 15 may extend through horizontally aligned anchor members on the gate, and be attached to anchor members at opposite sides of the car in the manner shown in Fig. 4, above described. At the top of the gate, it is usually not essential to run a strap entirely across the gate, but two short straps on opposite sides looped to an anchor member of the gate and an anchor member at the side of the car are sufficient, as seen in the top part of Fig. 2. The lighter load will be at the top, and these short straps are sufficient to keep a portion of that load from sliding through the space between the edge of the gate and the car lining.

The only difference between the construction of an end gate 19 and a center gate 20 is the fact that the center gate has a hinged lower section. One of the center gates is shown more in detail in Fig. 9, and it will be seen that a hinge 23 of the type commonly referred to as a piano hinge, extends across the lower portion of the gate and joins a pivot or lower section 24 to the upper section. The hinge is preferably placed in a slot in the reinforcing 22, and a similar slot in the retaining channels 6 so as not to add to the thickness of the gate. The reason for the hinging of the lower section on the center gates 20 is to facilitate raising and lowering of these gates, since the gates may be disposed at any desired position lengthwise of the car, and in some cases there may not be room to elevate one of the center gates, especially over the doorway area, unless the lower section is first pivoted, all as will more fully later appear herein.

All the gates are similarly mounted in the car, and may be moved lengthwise of the car to a desired location, as well as raised and lowered when necessary. The mounting and operation of the gates are best illustrated in Figs. 2, 3 and 8. In order to permit movement of the gate lengthwise of the car, a flanged track 25 is provided along the top of each of the side linings 3. An angle rod having a horizontal leg 26 and a vertical leg 27 is associated with the upper corner on each side of the gate. The vertical leg 27 extends downwardly inside the adjacent retaining channel 6, and the horizontal leg 26 forms the shaft for a wheel 28 disposed in the track 25 and rotatable relatively to the leg 26. The adjacent channel iron roof support 29 for the car has a flange overlying the top of the wheel, and the wheel is effectively retained in the track, both by this overhang and the flange on the track. This arrangement also forms opposed pivot points for the gate at the upper end thereof so that the gate may be swung into horizontal position adjacent the roof of the car as indicated in dotted lines in Figs. 2 and 8, or disposed in vertical position against the load as indicated in full lines in Figs. 2 and 3.

Centrally of the car roof 1a is a depending V-shaped track 30 extending lengthwise of the car. Engaged over the flanges of the track 30 is a complementally shaped spring carrier 31 which is provided with inwardly turned flanges extending over the upper faces of the track flanges as seen in Fig. 2. The spring carrier 31 is slidable along the track 30. To the underside of the carrier 31 a relatively heavy spring 32 is affixed at one end, and the other end of the spring extends downwardly inside the center retaining channel 6 of the door as seen best in Figs. 2 and 3.

Now with reference to Fig. 8, it will be seen that the normal shape of the spring 32 is substantially that of the U, as shown in full lines in Fig. 8. This spring therefore tends to hold the gate 19 in a position of downward inclination approximating 15°. In order to position the gate against a load, it must be forced down to the left-hand dotted line position of Fig. 8 against the action of the spring, so that it is under spring pressure when disposed against a load, and this eliminates rubbing or chafing of the load by the gate.

When the gate is not in use, it is pushed upwardly, also against the action of the spring to a horizontal position as indicated in the right-hand dotted line showing of Fig. 8. Means are preferably provided to hold the gate in its upward horizontal position, and in the illustrated instance these means are shown only in Fig. 2 and include a Z-bar 33 depending from the car roof and an automatic spring urged latch 34 having a beveled end 35 to cam over the lower flange of the Z-bar when the gate is forced upwardly into horizontal position. A latch string 36 may be attached to the rear end of the latch bolt 34, passed through a suitable eye 37 secured to the gate, and extend downwardly within reach of an operator to release the gate when it is desired to lower it.

Obviously, similar latch means are associated in a suitable location for holding up the center gates 20, and depending upon the size of the gates the latch means may be on the section above the hinged flap 24 if the gate is to be folded while in elevated position, and on both sections of the gate in the event the gate is to be fully extended when in elevated horizontal position.

When the gates are not utilized to hold a load, the four of them may be disposed horizontally inside the roof of the car, and substantially fill the space lengthwise of the car, so as to provide a dead air space 38 between the gates and the car roof as seen in Fig. 10. This dead air space is beneficial when a moisture absorbing commodity, usually a bulk load such as flour, is carried in the car, since the gate arrangement tends to keep moisture away from such commodity.

With reference again to Fig. 2, it will be seen that in order to hold the gate downwardly against accidental raising when the straps 15 are cut, a spring bolt 39 may be mounted on the lower edge of the gate to enter a floor socket 40, if such structure is desired.

In use, the instant invention is extremely simple and satisfactory. Everything, with the exception of the expendible metallic strapping needed for the securing of any character of load, is already mounted in the car, and cannot be removed from the car to become lost, strayed or stolen. The load is merely placed in the car, the anchor members adjusted to the desired position, and the strapping affixed in place. Should there be a change in character of the load, or should it be desired to section the load for stop-over freight shipments, it is simple expedient to pull down a gate in position against a load section, and strap the gate in place, as above explained. With reference to Fig. 1, it will be seen that it is a simple expedient to place cross straps 15 over the door area, such straps running lengthwise of the car, to reduce the side pressure upon the doors during transit, and to protect the receiver when the doors are opened. With the arrangement shown in Fig. 1, it is a simple expedient for the first receiver to remove the lading from the door area. This receiver need not level off the remainder of the load, because it is all firmly secured behind the center gates, and if those gates are not in use, it may be firmly secured by the strapping so that the leveling off operation may be eliminated entirely with the instant invention.

Now with reference to Figs. 10 and 11, I have illustrated different ways of securing different loads. In the lower portion of Fig. 10, I have a relatively heavy load 41 at the bottom, and this load is strapped as indicated at 15 with the width of the strap being disposed vertically. A light or balloon load 42 may be disposed on top of the load 41, and to this and other straps 15 are disposed with the width of the strap horizontally to form a temporary deck beneath the lightweight load 42, and also hold down the heavy load 41 against upward movement when the car is switched, shunted, or humped.

In Fig. 11 I have illustrated how an extra heavy load 43 may be firmly secured, and the side walls of the car protected with the use of double strapping. In this instance, the straps are shown by single lines only, and an outer strap 15 may be looped to the cross bar of an anchor member 11 at the right-hand side of the figure, threaded through the intermediate anchor member, and turned over the cross bar on the left-hand anchor member then to extend across the load and be similarly secured on the opposite side of the car. Thus, three separate anchor members are helping carry each end portion of that particular outside strap. At the same time, an inside strap may be connected or looped to the cross bar of the intermediate anchor member and also turned around the cross bar of the left-hand anchor member, and similarly secured on the opposite side of the car. Where they pass over a portion of the load, the straps are juxtaposed so that both straps are holding the same part of the load. The use of double strapping obviously gives twice the strength of single strapping, and, with the strapping attached in the manner above described along the side of the car to two or more anchor members, the reaction to the pull on the strap is distributed over a greater area of the side walls of the car.

Now it will be noted that when the gates 19 and 20 are in raised position, the full registered cubic foot capacity and the full registered dimensions are available inside the car. The full registered cubic foot capacity of a car is measured as a flat top volume between the side and end walls of the car. Thus, the space defined by the roof above the walls, which stores the gates 19 and 20 when they are not in use, is not included in the full registered cubic foot capacity thereby permitting this capacity to be available when the gates are stored in raised position. Further, it will be especially noted that there is no injury to the car by virtue of the securement and removal of dunnage, and there is no dunnage expense, either material or labor, upon the shipper or the receiver, with the single exception of the expendible metal strapping.

It will be understood that modifications and variations may be effected without departing from the scope of the novel concepts of the present invention.

I claim as my invention:

1. Cargo loading apparatus, including rails channel-shaped in cross-section fixed to the side walls of the compartment to be loaded, edgewise confronting and spaced front flanges on said rails spaced outwardly from the base thereof, apertures in said flanges, anchor members for metal strapping slidable in said rails, and opposed pins projecting from each anchor member for engagement in selected apertures of both said front flanges.

2. Cargo loading apparatus, including rails channel-shaped in cross-section fixed to the side walls of the compartment to be loaded, edgewise confronting and spaced front flanges on said rails spaced outwardly from the base thereof, anchor members for metal strapping slidable in said rails, each anchor member being ring-like in shape, and two sets of diametrally opposed pins projecting from each anchor member for insertion in selected apertures of said front flanges.

3. Cargo loading apparatus, including rails channel-shaped in cross-section fixed to the side walls of the compartment to be loaded, edgewise confronting and spaced front flanges on said rails spaced outwardly from the base thereof, anchor members for metal strapping slidable in said rails, each anchor member comprising a flat ring, opposed pins projecting from the inner face of said ring for insertion in selected apertures of said front flanges, and a diametral bar for engagement by metal strapping extending across the open center portion of said ring.

4. Cargo loading apparatus, including rails channel-shaped in cross-section fixed to the side walls of the compartment to be loaded, edgewise confronting and spaced front flanges on said rails spaced outwardly from the base thereof, and anchor members each comprising a flat ring slidable and rotatable within a rail, two sets of diametrally opposed pins projecting from the inner face of said ring for insertion in selected apertures of said front flanges one set at a time, and a diametral bar extending across the open center portion of said ring for engagement by metal strapping whereby selective positioning of each ring allows said strapping to be disposed with its width vertical or horizontal.

5. A fastening device for use with a rail secured to a wall or other surface and provided with a relatively wide elongated channel behind a narrower slot defined by spaced apertured flanges, comprising a ring-shaped member slidably received in said rail channel, said ring having sets of diametrally opposed pins to be selectively received in the apertured flanges and a cross bar for securing a strap-like member thereto, one set of diametrally opposed pins being in alignment with said cross bar.

6. Cargo loading apparatus for use within a compartment to be loaded, including rails fixed to the side wall of the compartment, each rail having an elongated base plate and a pair of spaced coplanar flanges attached to the opposite sides of said base plate and spaced therefrom, said flanges being provided with a series of aligned apertures, said rails defining a relatively wide elongated channel behind a narrower slot, a ring shaped member slidably received in said channel and having two sets of diametrally opposed pins projecting from one face of said member for insertion in selected apertures of said flanges, and a cross bar extending across the open center of said ring for engagement by metal strapping.

7. Cargo loading apparatus for use within a compartment to be loaded, including rails fixed to the side walls of the compartment, each rail having an elongated base plate and a pair of spaced coplanar flanges attached to the opposite sides of said base plate and spaced therefrom, said flanges being provided with a series of aligned apertures, said rails defining a relatively wide elongated channel behind a narrower slot, a ring shaped member slidably received in said channel and having two sets of diametrally opposed pins projecting from one face of said member for insertion in selected apertures of said flanges, and a cross bar extending across the open center of said ring for engagement by metal strapping, the axis of said cross bar being aligned with one set of pins, whereby selective positioning of said sets of pins disposes the cross bar horizontally or vertically.

8. Cargo loading apparatus, including retaining rails fixed to the side walls of compartment to be loaded, edgewise confronting and spaced front flanges on said rails spaced outwardly from the base thereof, said front flanges having numerous apertures therealong, flat ring-like anchor members for load holding straps slidable in said rails behind said front flanges, a plurality of pins on each said anchor member for engagement at the same time in selected apertures to hold the anchor member fixed in position, and a diametral bar secured to each said anchor member and extending across the inside of each anchor member for engagement by a strap.

9. An anchoring member for cargo holding strapping and for use with a rail secured to a wall or similar surface which rail is provided with a relatively wide elongated channel behind a narrower slot defined by spaced apertured flanges, comprising a flat ring-shaped member slidable in said rail channel, a plurality of pins projecting from one face of the solid part of said member for insertion at the same time in selected apertures to fix said member in position for use, and a diametral bar secured to said member and extending across the opening in said member for engagement with a cargo holding strap, said bar being flush with the face of said member opposite said pins.

10. An anchoring member for cargo holding strapping and for use with a rail secured to a wall or similar surface which rail is provided with a relatively wide elongated channel behind a narrower slot defined by spaced apertured flanges, comprising a flat ring-shaped member slidable in said rail channel, a plurality of pins projecting from one face of the solid part of said member for insertion at the same time in selected apertures to fix said member in position for use, and a diametral bar secured to said member and extending across the opening in said member for engagement with a cargo holding strap, said bar being at least as thick as said member plus the length of a pin whereby a strap must be threaded around said bar.

11. An anchoring member for cargo holding strapping and for use with a rail secured to a wall or similar surface which rail is provided with a relatively wide elongated channel behind a narrower slot defined by spaced apertured flanges, comprising a flat ring-shaped member slidable in said rail channel, a plurality of pairs of diametrally opposed pins projecting from one face of the solid part of said member for insertion a pair at a time in selected apertures to hold said member in fixed position for use, a diametral bar secured to said member and extending across the opening in said member, said bar being substantially the thickness of said member plus the length of a pin, one pair of said pins being in alignment with said bar, and one pair of said pins being on a diameter at right angles to said bar.

References Cited in the file of this patent

UNITED STATES PATENTS

| | | |
|---|---|---|
| 254,630 | Farrar | Mar. 7, 1882 |
| 1,193,254 | Gibbs | Aug. 1, 1916 |
| 1,224,130 | Bohn | May 1, 1917 |
| 1,247,230 | Daly | Nov. 20, 1917 |
| 1,705,060 | Hintz | Mar. 12, 1929 |
| 1,726,709 | McChesney et al. | Sept. 3, 1929 |
| 1,867,352 | Churgay et al. | July 12, 1932 |
| 2,047,503 | Wilson et al. | July 14, 1936 |
| 2,056,704 | Anderson | Oct. 6, 1936 |
| 2,165,652 | Reifer et al. | July 11, 1939 |
| 2,220,436 | Ziegler | Nov. 5, 1940 |
| 2,226,373 | Frear | Dec. 24, 1940 |
| 2,227,807 | Dixon | Jan. 7, 1941 |
| 2,294,795 | Moses | Sept. 1, 1942 |
| 2,353,017 | Denton | July 4, 1944 |
| 2,490,434 | Harris | Dec. 6, 1949 |
| 2,555,529 | Batts | June 5, 1951 |
| 2,559,240 | Wiggin | July 3, 1951 |
| 2,576,425 | Thearie | Nov. 27, 1951 |
| 2,577,504 | Barber | Dec. 4, 1951 |
| 2,605,064 | Davis | July 29, 1952 |
| 2,610,587 | Pietzsch | Sept. 16, 1952 |
| 2,688,289 | Sterling | Sept. 7, 1954 |
| 2,688,504 | Parker | Sept. 7, 1954 |